United States Patent
Seo et al.

(10) Patent No.: US 6,798,482 B2
(45) Date of Patent: Sep. 28, 2004

(54) IN-PLANE SWITCHING MODE LIQUID CRYSTAL DISPLAY DEVICE

(75) Inventors: Seong Moh Seo, Kyungki-do (KR); Yong Sung Ham, Kyungki-do (KR); Jong Jin Park, Seoul (KR); Hyun Ho Shin, Kyungki-do (KR); Young Soo Ahn, Kyungki-do (KR)

(73) Assignee: LG.Philips LCD Co., Ltd, Seoul (KR)

( * ) Notice: Subject to any disclaimer, the term of this patent is extended or adjusted under 35 U.S.C. 154(b) by 0 days.

(21) Appl. No.: 09/954,031

(22) Filed: Sep. 18, 2001

(65) Prior Publication Data

US 2002/0159015 A1 Oct. 31, 2002

Related U.S. Application Data

(63) Continuation of application No. 09/149,746, filed on Sep. 8, 1998, now Pat. No. 6,297,866.

(30) Foreign Application Priority Data

Sep. 8, 1997 (KR) .......................................... 1997-46190

(51) Int. Cl.[7] ............................................. G02F 1/1343
(52) U.S. Cl. ........................................ 349/141; 349/139
(58) Field of Search ................................. 349/139, 141, 349/106, 110, 123

(56) References Cited

U.S. PATENT DOCUMENTS

| 5,745,207 A | * | 4/1998 | Asada et al. ................ 349/141 |
| 5,995,186 A | * | 11/1999 | Hiroshi ....................... 349/128 |
| 6,266,116 B1 | * | 7/2001 | Ohta et al. ................... 349/141 |
| 6,297,866 B1 | * | 10/2001 | Seo et al. .................... 349/141 |
| 6,342,937 B2 | * | 1/2002 | Hiroshi ....................... 349/128 |

* cited by examiner

Primary Examiner—Toan Ton
(74) Attorney, Agent, or Firm—McKenna Long & Aldridge LLP

(57) ABSTRACT

An in-plane switching mode liquid crystal display device includes first and second opposed substrates having inner surfaces in which a liquid crystal layer formed therebetween, a data bus line and a gate bus line arranged perpendicularly and/or horizontally in a matrix on the first substrate thereby defining a unit pixel region, and a pair of data electrode and common electrode applying a plane electric field in the liquid crystal layer, the electrodes being inclined with respect to the data bus line and parallel to each other.

24 Claims, 7 Drawing Sheets

IN-PLANE SWITCHING MODE LIQUID CRYSTAL DISPLAY DEVICE

This application is a continuation of application Ser. No. 09/149,746 filed on Sep. 8, 1998 now U.S. Pat. No. 6,297,866.

This application claims the benefit of Korean Patent Application No. 1997-46190, filed Sep. 8, 1997, which is hereby incorporated by reference.

BACKGROUND OF THE INVENTION

1. Field of the Invention

The present invention relates to a liquid crystal display device, and more particularly, an in-plane switching mode liquid crystal display device.

2. Discussion of the Related Art

To solve the problem of viewing angle limitation in twisted nematic LCDs, a multi-domain LCD, such as a two-domain TN LCD (TDTN LCD) and a domain divided TN LCD (DDTN LCD), and a TN LCD including an optical compensation film have ben proposed. In these LCDs, however, a contrast ratio is decreased and a color shift is generated according to a viewing angle.

Further, for the purpose of a wide viewing angle, an in-plane switching mode LCD has also been proposed.

FIG. 1 is a plan view of a unit pixel of a conventional in-plane switching mode active matrix LCD. As shown in the drawing, the LCD comprises a data bus line 1 and a gate bus line 2, in which lines 1 and 2 are arranged perpendicularly and/or horizontally in a matrix on a transparent substrate thereby defining a unit pixel region. A common line 5 is arranged parallel to the gate bus line 2 in the pixel region. A thin film transistor (TFT) is formed adjacent a cross point of the data bus line 1 and the gate bus line 2. A common electrode 11 and a data electrode 19 are formed in the pixel region.

FIG. 2 is a sectional view according to line I–I' of FIG. 1. As shown in the drawing, the TFT includes a gate electrode 10 electrically coupled to the gate bus line 2, a gate insulator 13 on the gate electrode 10, an amorphous silicon (a-Si) semiconductor layer 15 on the gate insulator 13, an n+ a-Si layer 16 on the semiconductor layer 15, and source/drain electrodes 17, 18 which are electrically coupled to the data bus line 1 and the data electrode 19, respectively.

The common electrode 11 is electrically coupled to the common line 5, and the data electrode 19 is electrically coupled to the drain electrode 18. Further, a passivation layer 20 and a first alignment layer (not illustrated) are deposited on the data electrode 19 and the gate insulator 13.

On a second substrate 4, a black matrix 6 is formed to prevent a light leakage around the TFT, the data bus line 1, and the gate bus line 2. A color filter layer 7, an over-coat layer 8, and a second alignment layer (not illustrated) are formed on the black matrix 6 in sequence. Finally, a liquid crystal layer is formed between the first and second alignment layer.

FIG. 3 is a drawing showing a structure of the electrodes driving a liquid crystal according to the conventional in-lane switching mode LCD.

Referring to FIG. 3, when a voltage is applied to the liquid crystal layer, the liquid crystal 30 has an average rotation of 45 degrees by the electric field between the common electrode 111 and the data electrode 119 thereby generating a gray inversion in a rotating direction. In particular, in a gray mode, yellow color is presented at +45 degrees of azimuth angle, and blue color is presented at −45 degrees of azimuth angle to a polarizer P by an optical anisotropy of the liquid crystal.

SUMMARY OF THE INVENTION

Accordingly, the present invention is directed to an in-plane switching mode LCD that substantially obviates one or more of the problems due to limitations and disadvantages of the related art.

An object of the present invention is to provide an in-plane switching mode LCD having no color-shift and no gray inversion by zigzag patterns of a plurality of electrodes which apply a plane electric field.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device comprises first and second substrates; a data bus line and a gate bus line arranged in a matrix on said first substrate and defining a unit pixel region; a pair of electrodes applying a plane electric field in said liquid crystal layer, the electrodes being at an angle θ with respect to said data bus line and substantially parallel to each other; and a liquid crystal layer between said first and second substrates.

In another aspect of the present invention, a method of forming a liquid crystal display device comprises the steps of forming first and second substrates; forming a data bus line and a gate bus line arranged in a matrix on said first substrate and defining a unit pixel region; forming a pair of electrodes applying a plane electric field in said liquid crystal, the electrodes being at an angle θ with respect to said data bus line and substantially parallel to each other; and forming a liquid crystal layer between said first and second substrates.

In another feature according to the present invention, a pixel region is divided into a plurality of sub-pixel regions by a plurality of data electrode and common electrode in which the electrodes are in each of sub-pixel regions and this structure is symmetric to another structure in an adjacent sub-pixel region. It is preferable to divide a pixel region into four sub-pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
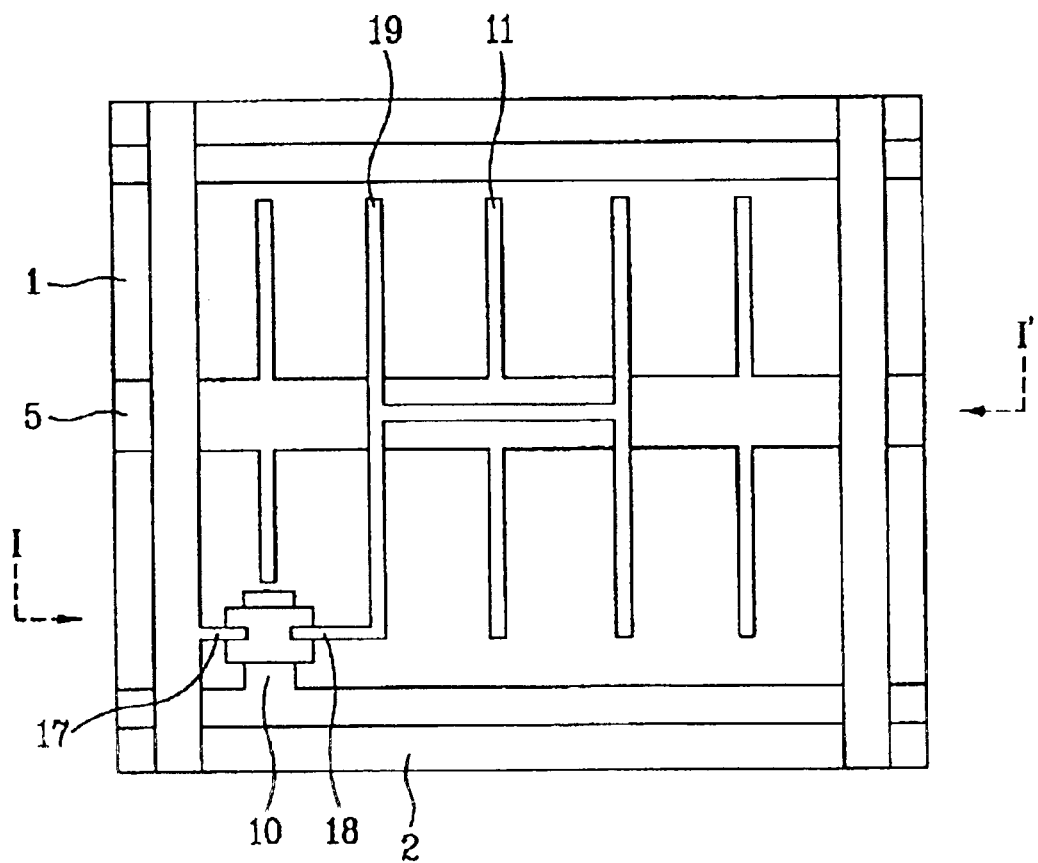
FIG. 1 is a plan view of a unit pixel of a conventional in-plane switching mode LCD.
Figure 2:
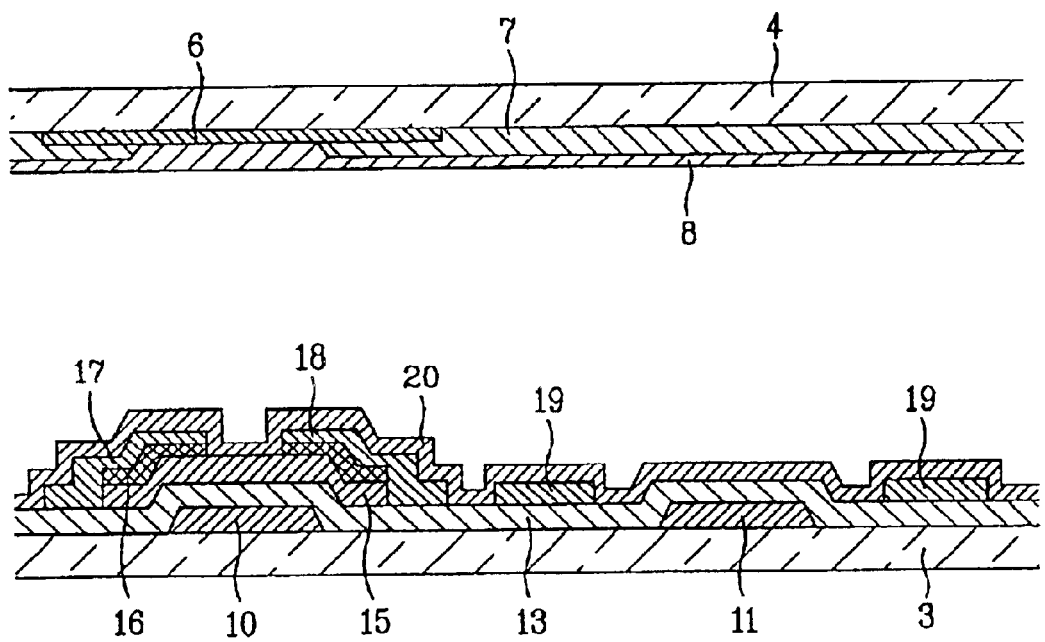
FIG. 2 is a sectional view according to line I–I' of FIG. 1.
Figure 3:
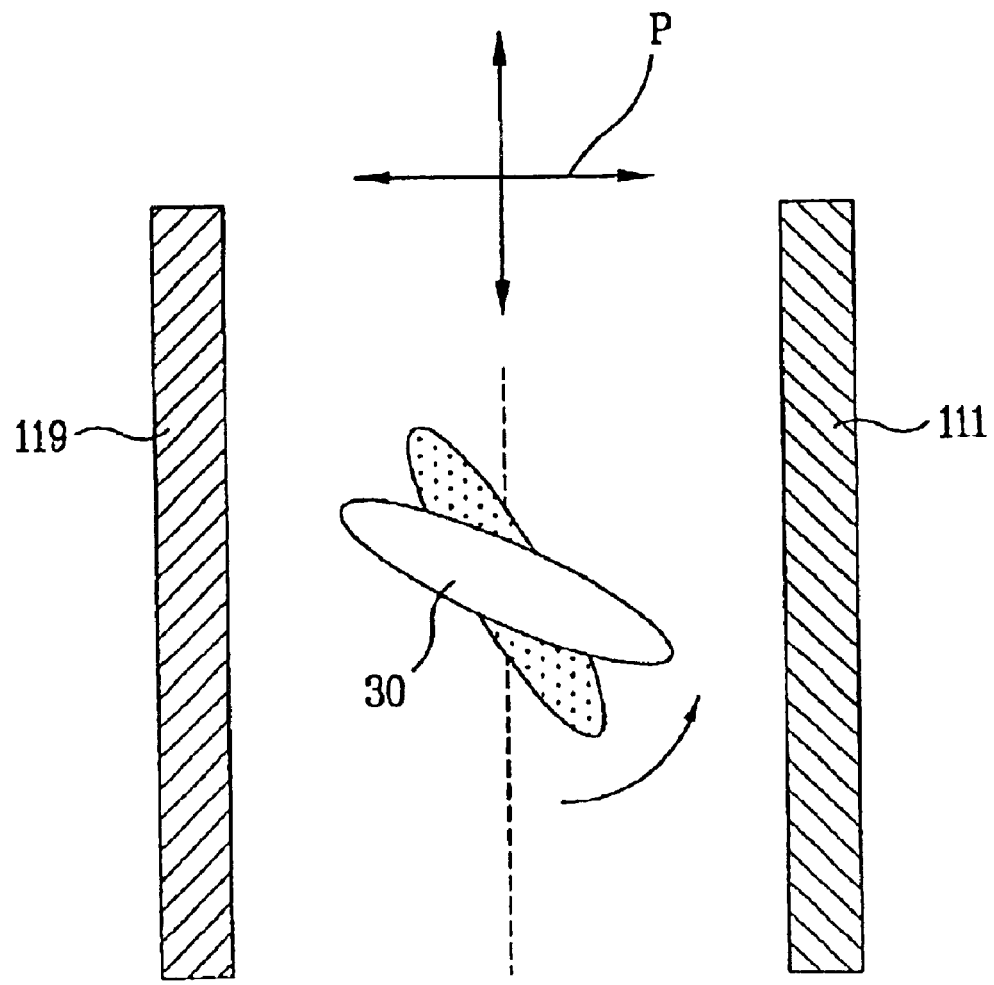
FIG. 3 is a drawing showing a structure of the electrodes driving a liquid crystal according to the conventional in-plane switching mode LCD.

Hereinafter, the preferred embodiment of the present invention will now be made in detail, an example of which is illustrated in the accompanying drawings.

Although not shown in the drawing, an LCD according to the present invention comprises first and second opposed transparent substrates having inner surfaces, a data bus line and a gate bus line arranged perpendicularly and/or horizontally in a matrix on a transparent substrate thereby defining a unit pixel region, a common line arranged parallel to the gate bus line in the pixel region, a thin film transistor adjacent a cross point of the data bus line and the gate bus line, and a common electrode and a data electrode having a zigzag pattern in the pixel region.

The TFT of the present invention includes a gate electrode electrically coupled to the gate bus line, a gate insulator made of SiNx or SiOx, for example, on the gate electrode, an amorphous silicon semiconductor layer on the gate insulator, a n$^+$ amorphous silicon semiconductor layer on the semiconductor layer, and source/drain electrodes which are electrically coupled to the data bus line and the data electrode respectively.

The common electrode. is preferably formed with the gate electrode and electrically coupled to the common line. Further, a passivation layer made of SiNx or SiOx, for example, and a first alignment layer are deposited on the inner surface of the first substrate.

On the second substrate, a black matrix made of CrOx or black resin, for example, is formed to prevent a light leakage around the TFT, the data bus line, and the gate bus line. A color filter layer including color filter elements R, G, and B, an over-coat layer, and a second alignment layer are formed on the black matrix, respectively.

Each alignment direction of the first and second alignment layers is determined by a rubbing method using polyamide, polyimide, SiO$_2$, PVA (polyvinylalcohol) or polyamic acid, or by a photo-alignment method using a photosensitive material such as PVCN (polyvinylcinnamate), PSCN (polysiloxanecinnamate) or CelCN (cellulosecinnamate).

Although color-shift and grey inversion generated in the in-plane switching mode LCDs are influenced by a back light, a color filter, dΔn of liquid crystal layer, and a structure of electrodes, the present invention focuses on the structure of the electrodes.

Figure 4A:
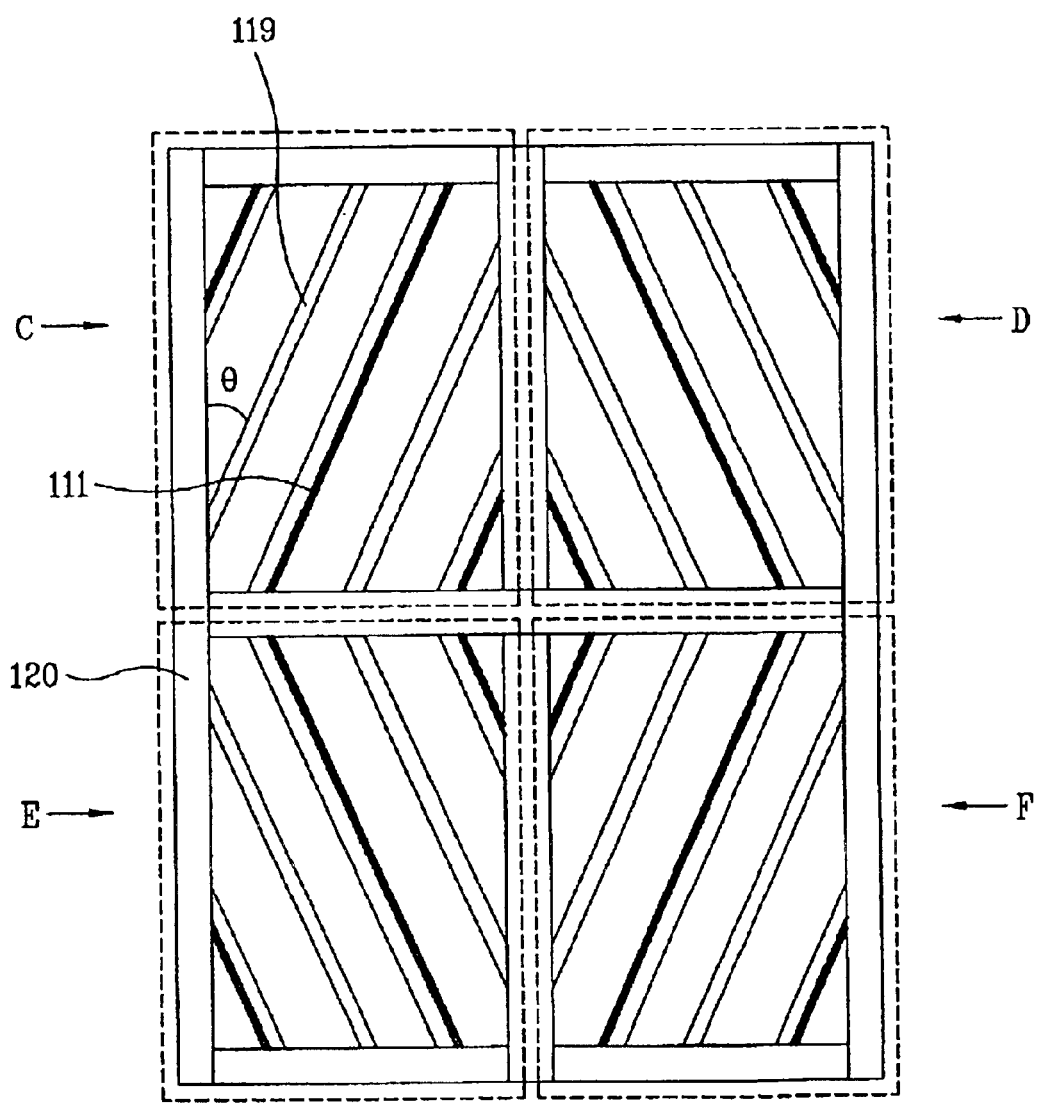
FIG. 4A is a drawing showing a structure of the electrodes according to the present invention.
Figure 4B:
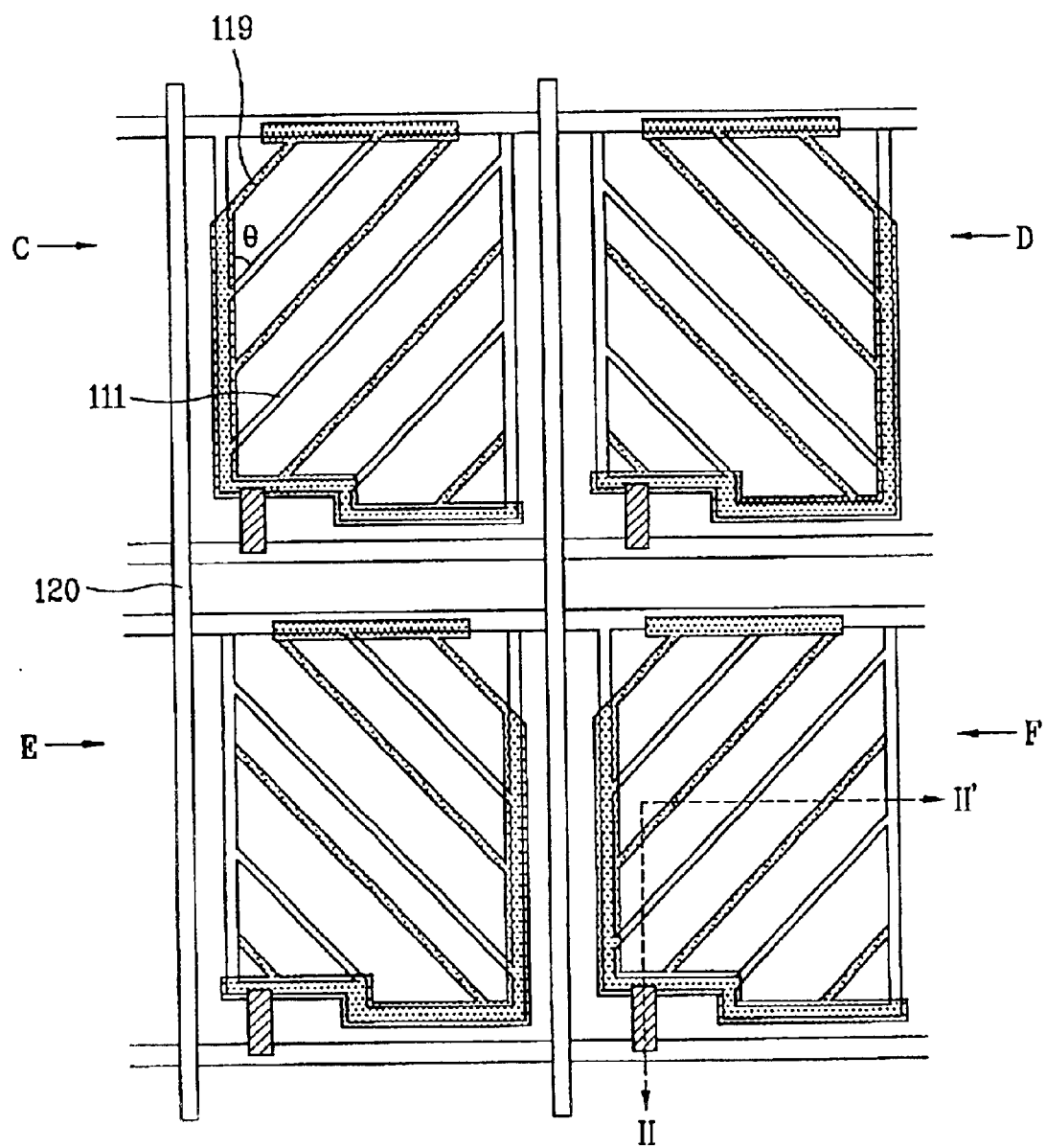
FIG. 4B is a plan view of a unit pixel of the inventive in-plane switching mode LCD.

FIG. 4A is a drawing showing a general structure of the electrodes according to the present invention and FIG. 4B is a plan view of a unit pixel of the inventive in-plane switching mode LCD. Referring to FIGS. 4A and 4B, a pair of common electrode 111 and the data electrode 119, which are inclined at an angle θ with reference to the data bus line 120, are in each of pixel regions C, D, E and F.

The above pixel regions C, D, E and F preferably have the same size, and the common electrodes 111 and the data electrodes 119 are preferably arranged in parallel to apply a plane electric field.

Further, to prevent color-shift and gray inversion, it is preferable that θ be about 20 degrees. However, the present invention is not limited to the about 20 degrees.

The structure of the electrodes in region C is preferably symmetrical to regions D, E and F, thereby forming a lozenge type as a unit constitution having four pixel regions. In addition, a pixel region may be divided into a plurality of sub-pixel regions in which the electrodes are in each of sub-pixel regions and this structure is symmetrical to another structure in an adjacent sub-pixel region.

Although not shown in the drawing, the pattern of the color filter layer having color filter elements R, G, and B correspond to the common electrode 111 and the data electrode 119.

Figure 5:
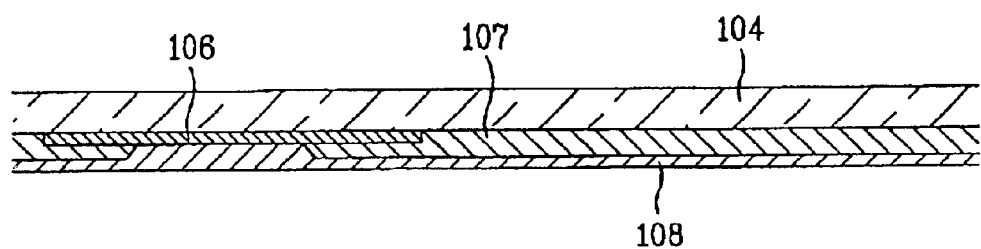
FIG. 5 is a sectional view according to line II–II' of FIG. 4B.
Figure 5:
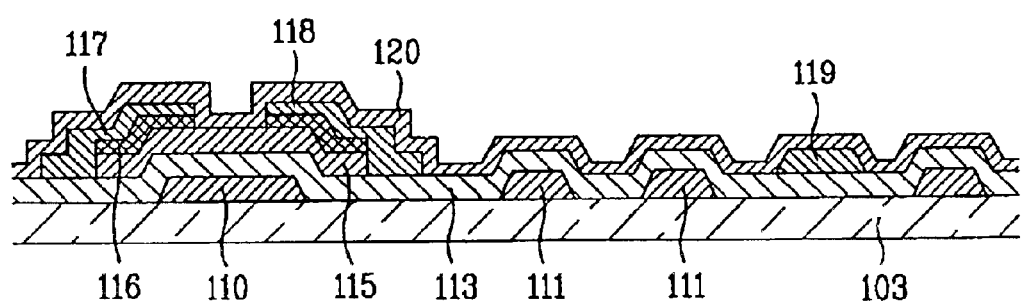

FIG. 5 is a sectional view according to line II–II' of FIG. 4. Referring to FIG. 5, the TFT includes a gate electrode 110 electrically coupled to the gate bus line(not shown)on a first substrate 103, a gate insulator 113 on the gate electrode 110, an amorphous silicon (a-Si) semiconductor layer 115 on the gate insulator 113, an n+ a-Si layer 116 on the semiconductor layer 115, and source/drain electrodes 117, 118 which are electrically coupled to the data bus line(not shown) and the data electrode 119, respectively.

The common electrode 111 is electrically coupled to the common line(not shown), and the data electrode 119 is electrically coupled to the drain electrode 118. Further, a passivation layer 120 and a first alignment layer (not shown) are deposited on the data electrode 119 and the gate insulator 113.

On a second substrate 104, a black matrix 106 is formed to prevent a light leakage around the TFT, the data bus line, and the gate bus line. A color filter layer 107, an over-coat layer 108, and a second alignment layer (not shown) are formed on the black matrix 106 in sequence. A liquid crystal layer is formed between the first and second alignment layer.

Figure 6:
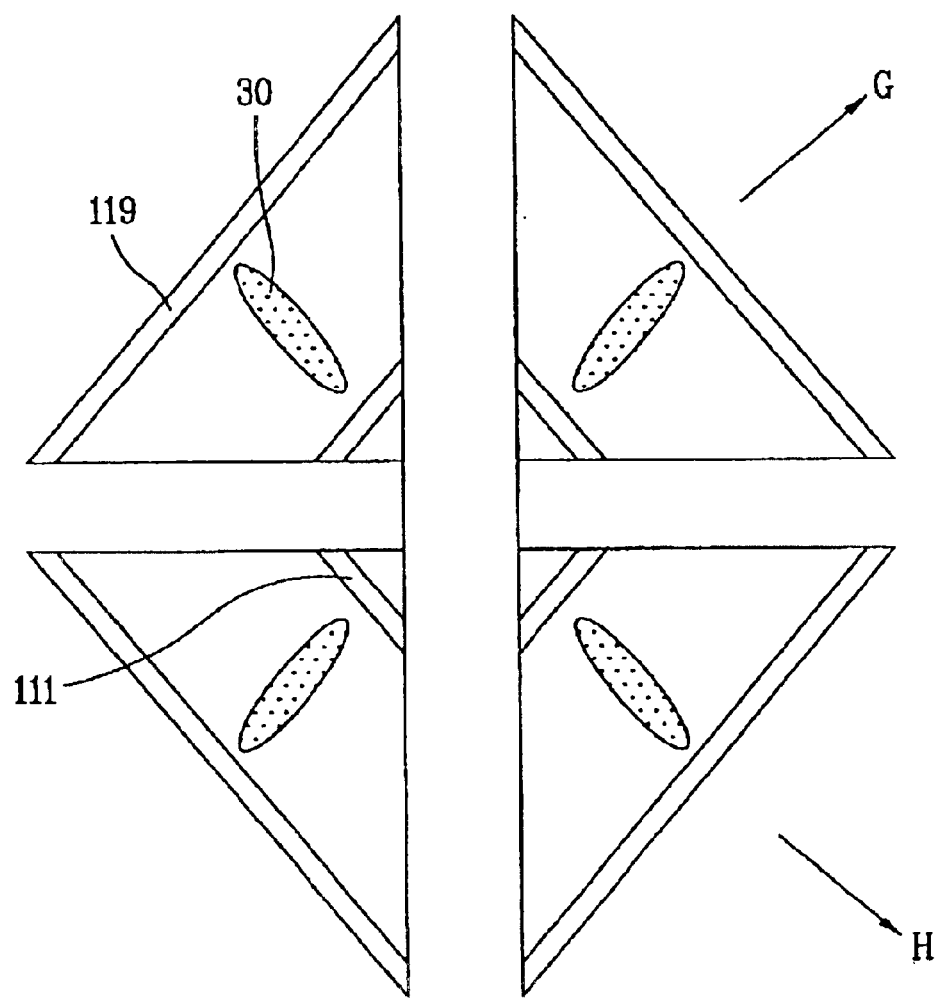
FIG. 6 is a drawing showing a structure of the electrodes driving a liquid crystal according to the present invention.

FIG. 6 is a drawing showing a structure of the electrodes driving a liquid crystal according to the present invention. Referring to FIG. 6, when a voltage is applied to the liquid crystal layer, the liquid crystals 30 are rotated (average) by the electric field between the common electrode 111 and the data electrode 119. This arrangement of the liquid crystals 30 compensates for the color-shift generated in each of the opposite angle directions G and H.

As a result, it is possible to prevent the apparatus from the color-shift and the gray inversion, which are generated at plus and/or minus 45 degrees of the azimuth angle in θ conventional in-plane switching mode liquid crystal display devices.

Accordingly, the modified structure of the electrodes in the liquid crystal display of the present invention prevents color shift. One of the distinguishable features from the prior art is that the patterns of the electrodes which apply a plane electric field are zigzag patterns thereby preventing color-shift as well as gray inversion.

It will be apparent to those skilled in the art that various modifications and variations can be made in the in-plane switching mode liquid crystal display of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device comprising:

first and second substrates;

a gate bus line and a data bus line on the first substrate and defining a unit pixel, the unit pixel being divided into a plurality of sub-pixels, wherein the sub-pixels substantially form a lozenge shape, and wherein alignment directions between sub-pixels are different from each other;

a pair of electrodes in each of the sub-pixels, the electrodes being at an angle with respect to the data bus line and being substantially symmetrical to an adjacent sub-pixel, wherein the pair of electrodes are substantially parallel and have substantially the same angle with respect to the data bus line; and a liquid crystal layer between the first and second substrates.

2. The device of claim 1, wherein the unit pixel is divided into at least two sub-pixels.

3. The device of claim 2, wherein the at least two sub-pixels have electrodes in different directions.

4. The device of claim 3, wherein the different directions are substantially perpendicular directions.

5. The device of claim 3, wherein the different directions are substantially parallel directions.

6. The device of claim 1, wherein the pair of electrodes includes a data electrode and a common electrode.

7. The device of claim 1, wherein the angle is about 20 degrees.

8. The device of claim 1, wherein the electrodes being at the angle prevents color shift.

9. The device of claim 1, further comprising:
a thin film transistor at a crossing point of the gate and data bus lines;
a common line in the unit pixel;
a passivation layer on the first substrate; and
a first alignment layer on the passivation layer.

10. The device of claim 1, further comprising:
a black matrix layer on the second substrate;
a color filter layer on the second substrate; and
a second alignment layer on the color filter layer.

11. The device of claim 10, wherein the black matrix layer includes one of CrOx and a black resin.

12. A method of forming a liquid crystal display device comprising:

forming a gate bus line and a data bus line on a first substrate and defining a unit pixel, the unit pixel being divided into a plurality of sub-pixels, wherein the sub-pixels substantially form a lozenge shape, and wherein alignment directions between sub-pixels are different from each other;

forming a pair of electrodes in each of the sub-pixels, the electrodes being at an angle with respect to the data bus line and being substantially symmetrical to an adjacent sub-pixel, wherein the pair of electrodes are substantially parallel and have substantially the same angle with respect to the data bus lien; and forming a liquid crystal layer between the first substrate and the second substrate.

13. The method of claim 12, wherein the unit pixel is divided into at least two sub-pixels.

14. The method of claim 13, wherein the at least two sub-pixels have electrodes in different directions.

15. The method of claim 14, wherein the different directions are substantially perpendicular directions.

16. The device of claim 15, wherein the electrodes being at the angle prevents gray inversion.

17. The method of claim 14, wherein the different directions are substantially parallel directions.

18. The method of claim 12, wherein the pair of electrodes includes a data electrode and a common electrodes.

19. The method of claim 12, wherein the angle is about 20 degrees.

20. The method of claim 12, wherein the electrodes being at the angle prevents color shift.

21. The method of claim 12, wherein the electrodes being at the angle prevents gray inversion.

22. The method of claim 12, further comprising:
forming a thin film transistor at a crossing point of the gate and data bus lines;
forming a common line in the unit pixel;
forming a passivation layer on the first substrate; and
forming a first alignment layer on the passivation layer.

23. The method of claim 12, further comprising:
forming a black matrix layer on the second substrate;
forming a color filter layer on the second substrate; and
forming a second alignment layer on the color filter layer.

24. The method of claim 23, wherein the black matrix layer includes one of CrOx and a black resin.

* * * * *